Figure 1:
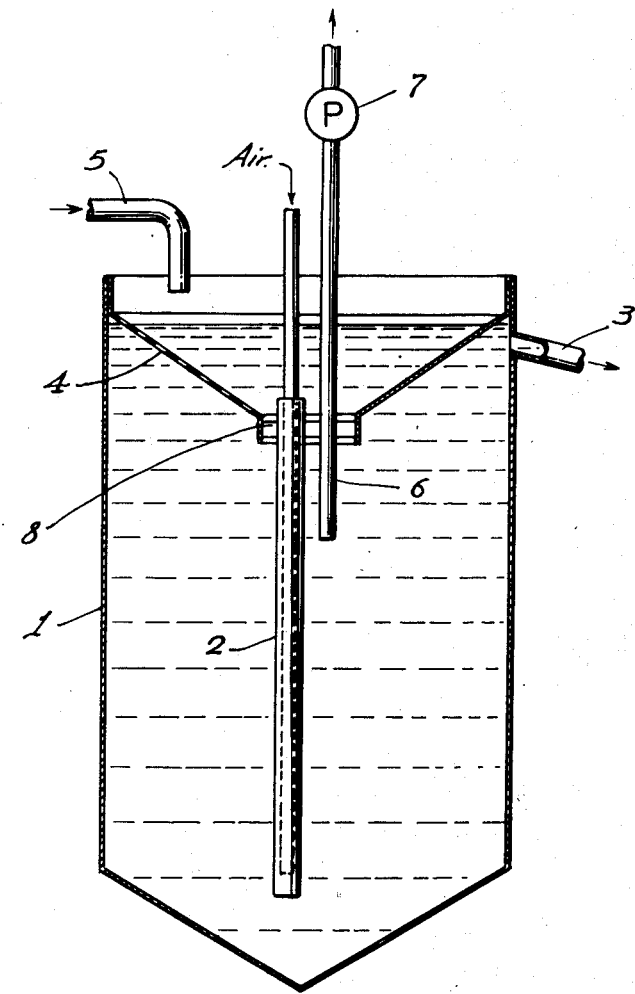

INVENTOR.
Ralph W. Brown.
BY-
Edward B. Foote
ATTORNEYS

Patented Sept. 29, 1953

2,653,858

UNITED STATES PATENT OFFICE 2,653,858

PRECIPITATION OF ALUMINUM HYDROXIDE

Ralph W. Brown, East St. Louis, Ill., assignor to Aluminum Company of America, Pittsburgh, Pa., a corporation of Pennsylvania Application September 22, 1951, Serial No. 247,861

5 Claims. (Cl. 23—143)

This invention relates to the production of aluminum hydroxide from alkali metal aluminate solutions, and relates particularly to auto-precipitation of aluminum hydroxide from such solutions.

The principal method used heretofore in the production of aluminum hydroxide has been to dissolve alumina from bauxite by means of an aqueous caustic soda solution, and then precipitate aluminum hydroxide by auto-precipitation from the resultant sodium aluminate solution by adding previously precipitated particles of aluminum hydroxide to the solution to act as "seed" particles in the precipitation of aluminum hydroxide from the solution, and agitating the solution. It has been customary to effect agitation of the solution by means of a stirrer, gas lift or pump, and to carry out the precipitation process as a batch operation in which sodium aluminate solution and the "seed" particles are fed into a tank in which the solution is thus agitated for a suitable time, after which the spent solution and precipitated aluminum hydroxide are removed from the tank.

It has also been proposed to carry out auto-precipitation of the aluminum hydroxide from sodium aluminate solutions by a continuous process in which fresh solution is fed continuously to a precipitation tank from which there is a continuous overflow of solution to a succeeding precipitation tank, the solution and aluminum hydroxide suspended therein being kept agitated in the tanks by means of pumps. (See U. S. Patent 1,943,786.) However, in order to precipitate aluminum hydroxide by auto-precipitation with maximum efficiency, and to produce a precipitate of relatively uniform particle size, it is desirable to control closely the amount and size of the particles of aluminum hydroxide available in the precipitation tanks to act as "seed" in the precipitation of further hydroxide.

The use of pumps to effect agitation of the solution results in breaking up many of the particles of aluminum hydroxide suspended in the sodium aluminate solution as that solution passes through the pump mechanism. Such breaking up of the particles is objectionable from the standpoint of controlling the number and size of the particles acting as "seed" in the solution. Furthermore, the smaller the particles of aluminum hydroxide, the more readily they are carried out of the tank with the overflow to the next tank, which further complicates the problem of controlling the amount and particle size of the aluminum hydroxide in both tanks. Also, pumps deteriorate rapidly on contact with the highly alkaline solution.

It has not been feasible heretofore to use a gas lift to agitate the sodium aluminate solution during such continuous auto-precipitation of the aluminum hydroxide, to avoid the above mentioned problems involved in using pumps, since the discharge from the gas lift would cause agitation of the solution at the level of the overflow from the precipitation tank, thereby promoting precipitation of particles of aluminum hydroxide at that level which would overflow from the tank and interfere with controlling the amount and particle size of the aluminum hydroxide in the succeeding tank. Furthermore, particles of aluminum hydroxide drawn into the gas lift would be carried upward to the overflow level of the tank, thus providing further particles in the overflow.

It is an object of this invention to provide a process for use in effecting continuous auto-precipitation of aluminum hydroxide from sodium aluminate solutions which permits the use of a gas lift, or a mechanical lift, to agitate the solution without having the discharge from the lift interfere with maintaining the solution quiescent and substantially free of particles of aluminum hydroxide adjacent the overflow outlet from the precipitation tank.

In accordance with the invention, sodium aluminate solution from which aluminum hydroxide is to be precipitated is fed continuously into a precipitation tank provided with an outlet in the upper portion thereof through which solution continuously flows out of the tank. Circulation of the solution is promoted by means of a gas lift, or a mechanical lift, in the tank, but the discharge from the lift is prevented by a baffle from affecting that portion of the solution from which the overflow occurs, with the result that agitation of that portion of the solution—and consequent precipitation of aluminum hydroxide therein—is inhibited, and any aluminum hydroxide particles discharged from the lift likewise do not reach that portion of the solution. As the particles of aluminum hydroxide in the solution increase in size by precipitation of additional aluminum hydroxide thereon, they settle to a level in the tank from which they are withdrawn.

The invention will be described in more detail with reference to the accompanying schematic drawings of preferred apparatus for use in carrying out the invention. Referring to Fig. 1, the precipitation tank 1 is provided with an air lift 2 of conventional type having an air-inlet pipe extending to adjacent the lower end of the air lift, overflow outlet 3, and the baffle 4, which is in the form of an inverted cone whose base is attached to the inner wall of the tank above the outlet 3. As shown, the upper end of the air lift 2 is encircled by the baffle 4, but is separated from the baffle to permit the solution discharged from the air lift to again mix with the solution therebelow. It is not essential that the annular baffle 4 be of the inverted cone form shown; for example, it may be in the form of a ring with vertical walls, instead of the sloping walls shown in Fig. 1. However, the inverted cone form is preferred since it facilitates de-aeration of the portion of the solution enclosed by the baffle.

The pipe 5 is provided to feed sodium aluminate solution into the tank. A withdrawal pipe 6 extends into the tank to the level from which aluminum hydroxide is to be withdrawn from the tank, the pipe being provided with a pump 7 to draw a slurry of such aluminum hydroxide into the pipe 6. The air lift 2 is carried by the baffle 4 by means of the bars 8.

In employing the above described apparatus, sodium aluminate solution from which aluminum hydroxide is to be precipitated is discharged continuously into the tank 1 from the pipe 5, and solution continually overflows at the same rate from the tank through the outlet 3. Initially a "seed" charge of particles of aluminum hydroxide may also be introduced along with the sodium aluminate solution. The solution in the tank 1 is kept agitated by means of the air lift 2, which draws solution into the open lower end thereof as air rises through it, and discharges the rising solution and air into the area enclosed by the baffle 4, thereby avoiding disturbing that portion of the column of solution which lies outside the baffle. Likewise, the baffle 4 keeps the incoming stream of solution from the pipe 5 from agitating the solution which is about to overflow through the outlet 3. Sodium aluminate solution is fed into the tank through the pipe 5 at a sufficiently rapid rate that the upward velocity of the solution will keep the aluminum hydroxide particles suspended in the solution, without lifting them to the level of the outlet 3.

The level at which the particles are kept in this manner depends on the size of the particles. The inlet end of the withdrawal pipe 6 is positioned at the level at which the particles of the size which it is desired to remove from the tank are kept suspended, and a slurry of such particles and solution is withdrawn through that pipe by the pump 7. As the smaller particles at a higher level in the tank increase in size through precipitation of additional aluminum hydroxide on them, they settle downward until they reach the level at which they can be drawn into the pipe 6. Aluminum hydroxide particles in the slurry withdrawn through the pipe 6 can be separated from the liquid component by filtration or sedimentation and decantation; the solution thus obtained can be mixed with the overflow from the outlet 3, if desired, for use as described below.

As the solution in the tank rises upward it passes through the suspended bed of particles of aluminum hydroxide, which promotes precipitation of aluminum hydroxide from the solution. The "spent" solution leaving the tank through the outlet 3 may be reused in extracting further alumina from bauxite, or may be subjected to a second auto-precipitation operation of the type already described to precipitate additional aluminum hydroxide therefrom.

Figure 2:
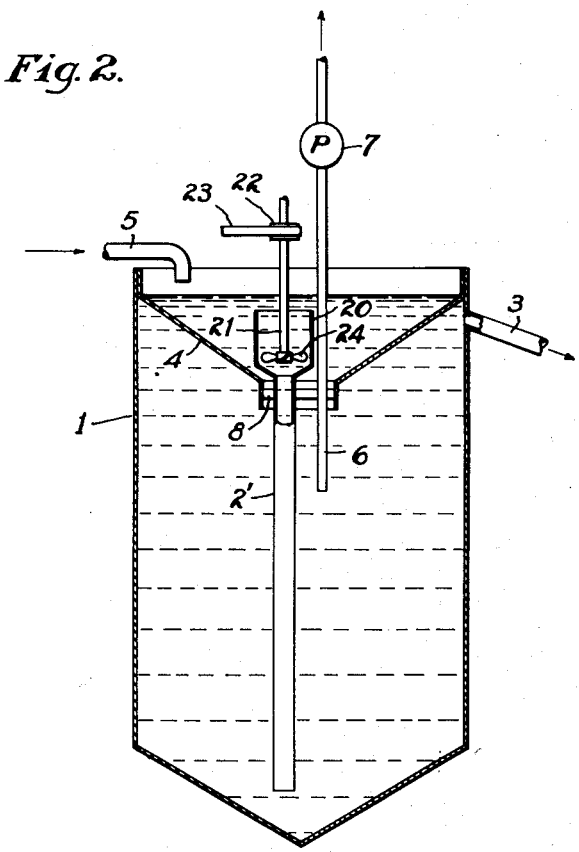

In Fig. 2 is illustrated an alternative method of carrying out the invention, in which a mechanical lift 2' is substituted for the air lift of Fig. 1. The lift 2' consists of a tube open at both ends, with the upper portion 20 thereof being enlarged to accommodate an impeller 21 that is rotatable therein. The shaft of the impeller is provided with a pulley 22, which is connected to a motor (not shown) by a drive belt 23. The blades 24 of the impeller are pitched to induce upward flow of solution through the lift when the impeller is rotated by the pulley 22. The remainder of the apparatus is similar to that shown in Fig. 1, and the same reference numerals are used in Figs. 1 and 2 to designate corresponding portions thereof.

The system shown in Fig. 2 operates in the same manner as the system shown in Fig. 1, except that instead of using a rising current of air to draw solution into the lower end of the lift 2' and discharge it into the area enclosed by the baffle 4, rotation of the impeller 21 by the belt 23 serves that purpose by causing a stream of solution to rise continuously through the lift 2' and discharge from the upper end thereof.

This application is a continuation-in-part of my abandoned application Serial No. 3,076, filed January 19, 1948.

I claim:

1. The process of producing aluminum hydroxide from a supersaturated alkali metal aluminate solution, which comprises continuously discharging a stream of such solution into an upper agitated portion of a tank in which a predetermined level of the solution is maintained, the said agitated upper portion being defined by separating walls but opening at the bottom into the underlying portion of the tank, withdrawing solution from the tank through an outlet which opens into that portion of the solution in the tank which is at the level of the said separating walls but is separated from the said agitated portion by the said walls, inducing flow downwardly through said opening into the lower portion of the said tank, and elevating a portion of said flow with particles of aluminum hydroxide found therein through a separated passage into the said upper portion defined by the said separating walls so that the said elevated solution agitates the solution in such upper portion, thereby causing auto-precipitation of aluminum hydroxide therefrom, and withdrawing from the said tank aluminum hydroxide precipitated therein.

2. The process of producing aluminum hydroxide from a supersaturated alkali metal aluminate solution, which comprises continuously discharging a stream of such solution into an upper agitated portion of a tank in which a predetermined level of the solution is maintained, the said agitated upper portion being defined by separating walls but opening at the bottom into the underlying portion of the tank, withdrawing solution from the tank through an outlet which opens into that portion of the solution in the tank which is at the level of the said separating walls but is separated from the said agitated portion by the said walls, inducing flow downwardly through said opening into the lower portion of the said tank, and elevating a portion of said flow with particles of aluminum hydroxide found therein through a separated passage into the said upper portion defined by the said separating walls so that the said elevated solution agitates the solution in such upper portion, thereby causing auto-precipitation of aluminum hydroxide therefrom, the said stream of solution being discharged into the tank at such a rate that a transverse layer of aluminum hydroxide precipitated in the tank is kept suspended below the said outlet, and withdrawing from the said tank aluminum hydroxide precipitated therein.

3. The process of producing aluminum hydroxide from a supersaturated alkali metal aluminate solution, which comprises continuously discharging a stream of such solution into an upper agitated portion of a tank in which a predetermined level of the solution is maintained, the said agitated upper portion being defined by separating walls but opening at the bottom into the underlying portion of the tank, withdrawing solution from the tank through an outlet which opens into that portion of the solution in the tank which is at the level of the said separating walls but is separated from the said agitated portion by the said walls, inducing flow downwardly through said opening into the lower portion of the said tank, and elevating a portion of said flow with particles of aluminum hydroxide found therein by an injected air stream through a separated passage into the said upper portion defined by the said separating walls so that said air stream and the said elevated solution agitates the solution in such upper portion, thereby causing auto-precipitation of aluminum hydroxide therefrom, and withdrawing from the said tank aluminum hydroxide precipitated therein.

4. The process of producing aluminum hydroxide from a supersaturated alkali metal aluminate solution, which comprises continuously discharging a stream of such solution into an upper agitated portion of a tank in which a predetermined level of the solution is maintained, the said agitated upper portion being defined by separating walls but opening at the bottom into the underlying portion of the tank, withdrawing solution from the tank through an outlet which opens into that portion of the solution in the tank which is at the level of the said separating walls but is separated from the said agitated portion by the said walls, inducing flow downwardly through said opening into the lower portion of the said tank, and elevating a portion of said flow with particles of aluminum hydroxide found therein by an injected air stream through a separated passage into the said upper portion defined by the said separating walls so that said air stream and the said elevated solution agitates the solution in such upper portion, thereby causing auto-precipitation of aluminum hydroxide therefrom, the said stream of solution being discharged into the tank at such a rate that a transverse layer of aluminum hydroxide precipitated in the tank is kept suspended below the said outlet, and withdrawing from the said tank aluminum hydroxide precipitated therein.

5. The process of producing aluminum hydroxide from a supersaturated alkali metal aluminate solution, which comprises continuously discharging a stream of such solution into an upper agitated portion of a tank in which a predetermined level of the solution is maintained, the said agitated upper portion being defined by separating walls but opening at the bottom into the underlying portion of the tank, withdrawing solution from the tank through an outlet which opens into that portion of the solution in the tank which is at the level of the said separating walls but is separated from the said agitated portion by the said walls, inducing flow downwardly through said opening into the lower portion of the said tank, and elevating a portion of said flow with particles of aluminum hydroxide found therein through a separated passage by an impeller into the said upper portion defined by the said separating walls so that the said elevated solution agitates the solution in such upper portion, thereby causing auto-precipitation of aluminum hydroxide therefrom, and withdrawing from the said tank aluminum hydroxide precipitated therein.

RALPH W. BROWN.

References Cited in the file of this patent
UNITED STATES PATENTS

| Number | Name | Date |
| --- | --- | --- |
| Re. 13,668 | Fickes | Jan. 6, 1914 |
| 994,679 | Hills | June 6, 1911 |
| 1,160,848 | Conklin | Nov. 16, 1915 |